J. W. POSTON.
LEAF LIFTING ATTACHMENT FOR PLOWS.
APPLICATION FILED JAN. 20, 1914.

1,094,096.

Patented Apr. 21, 1914.

Witnesses

Inventor
J. W. Poston
By Watson & Boyden
Attorneys

UNITED STATES PATENT OFFICE.

JOHN W. POSTON, OF BLOSSOM, SOUTH CAROLINA.

LEAF-LIFTING ATTACHMENT FOR PLOWS.

1,094,096.  Specification of Letters Patent.  Patented Apr. 21, 1914.

Application filed January 20, 1914. Serial No. 813,164.

*To all whom it may concern:*

Be it known that I, JOHN W. POSTON, a citizen of the United States, residing at Blossom, in the county of Florence and State of South Carolina, have invented certain new and useful Improvements in Leaf-Lifting Attachments for Plows, of which the following is a specification.

This invention relates to attachments for plows or sweeps used in the cultivation of tobacco, the attachment being designed to raise the tobacco leaves from the ground in advance of the plow, and to allow them to fall gently to the ground after the plow has passed, the arrangement being such that the earth thrown in toward the roots of the tobacco plants by the plow will not be thrown upon the leaves, thus avoiding injury to the leaves.

Figure 1:
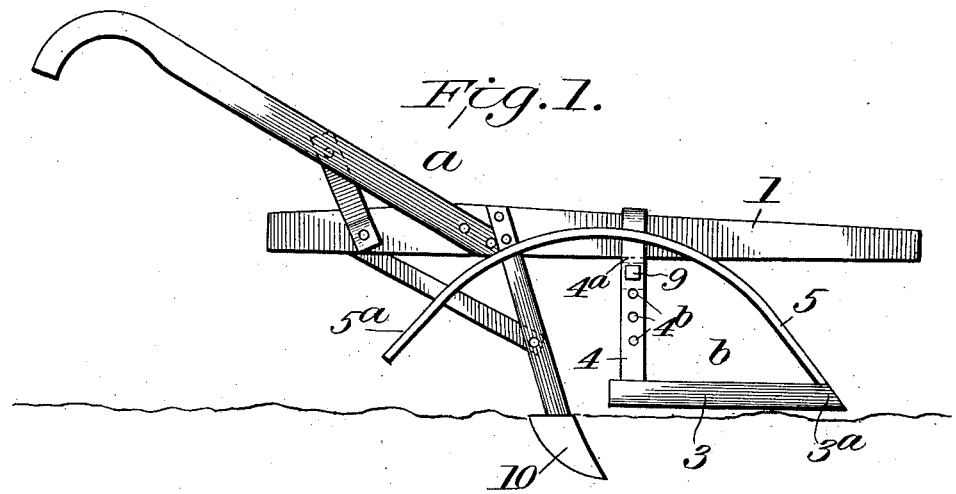
Figure 2:
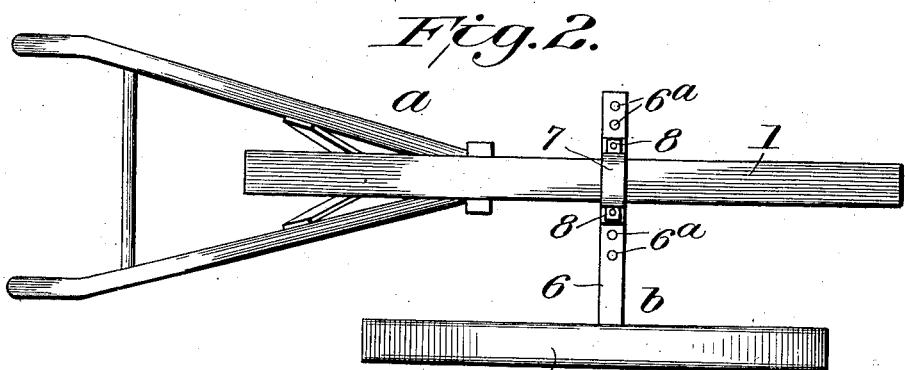
Figure 3:
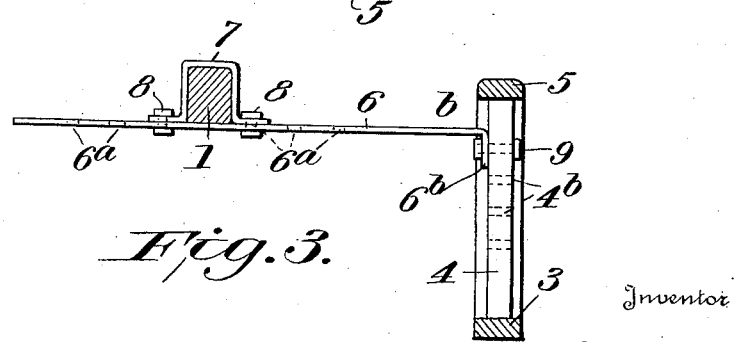

In the accompanying drawing, which illustrates my invention, Figure 1 is a side elevation of a plow or sweep having my improvements fitted thereon; Fig. 2 is a top plan view of the same; and, Fig. 3 is a section on the line 3—3 of Fig. 2.

Referring to the drawing, $a$ indicate a plow or sweep suitable for plowing between rows of tobacco plants and adapted to throw the earth inward toward the roots of the plants, and $b$ indicates the attachment for lifting the leaves out of the way of the roll of earth turned inwardly by the plow share. The body of the attachment is preferably made of wood for the sake of lightness, but it may be made of metal, and it comprises a frame consisting of a bar 3 adapted to lie horizontally and close to or in contact with the ground, and a bar 4 arranged substantially at right angles to the bar 3, the two ends of the bars connected together as shown. From the forward end of the bar 3, an arched member 5 extends over the top of the bar 4, and thence downwardly as shown at $5^a$ to a point near the ground. The member 5 is firmly secured to both of the bars 3 and 4, which form a supporting frame for the arch.

The device is attached to the plow beam 1 by an arm 6, which extends transversely under the beam and which is secured by a clevis 7 extending over the beam and provided with bolts 8 which pass through perforations in the arm. As shown, the arm has a longitudinal series of perforations $6^a$, through which the bolts 8 may be passed, to adjust the leaf lifting device to different distances, laterally, from the plow beam. The arm 6 has a downwardly turned end $6^b$ which is secured to the upright bar 4 by a bolt 9, and said bar has a vertical series of perforations $4^b$ adapted to receive the bolt 9, so that the leaf lifting device may be adjusted vertically with respect to the plow beam and the ground. The lateral adjustment is desirable in order that the plow may be operated at different distances from the roots of the plants, and the vertical adjustment is desirable in order to suit the depth of the furrow, as turned over by the plow blade or share.

In operation, the attachment is adjusted horizontally and vertically to suit the depth of the furrow, and the distance of the same from the roots of the plants. It is also adjusted forwardly or backwardly on the plow beam, by means of the clevis which fits over the same, so as to set the forward end of the bar 3 at a suitable distance in advance of the plow blade, to insure the lifting of the leaves in advance of the plow. As the plow is drawn forward, with the bar 3 close to or in contact with the ground, the leaves are engaged and are lifted by the forward half of the arch 5, while the earth is thrown through the arch by the plow blade toward the roots of the plants. The leaves then fall by gravity, as the plow passes onward, and are permitted to pass gently to the ground from the part $5^a$ of the arch at a distance to the rear of the plow share which insures the settling of the furrow before the leaves again come in contact with the ground. In the ordinary operation of plowing tobacco, the ends of many of the leaves are covered or bruised by the earth thrown upon them. In either case, under the action of the sun, what is generally known as a "burn" in the leaves results, with consequent waste, since the ends of the leaves are unfit for use and must be cut off. By means of my attachment the waste from this cause is avoided.

What I claim is:

A leaf lifting attachment for plows comprising an arm adapted to extend laterally from the plow beam and means for securing said arm to the beam in different positions of lateral adjustment, a frame, comprising an upright member connected to one end of said arm and vertically adjustable thereon and a horizontal member secured to the lower end of the upright member and projecting forwardly therefrom, and an arched member connecting the forward end of the horizontal member and the upper part of the upright member and curving downwardly and rearwardly from said latter member.

In testimony whereof I have affixed my signature, in presence of two witnesses.

JOHN W. POSTON.

Witnesses:
R. E. WHITING,
C. W. MALDROW.

Copies of this patent may be obtained for five cents each, by addressing the "Commissioner of Patents, Washington, D. C."